United States Patent
Lyons et al.

(10) Patent No.: US 10,113,368 B2
(45) Date of Patent: Oct. 30, 2018

(54) CUTTING ELEMENTS, EARTH-BORING TOOLS INCORPORATING SUCH CUTTING ELEMENTS, AND METHODS OF FORMING SUCH CUTTING ELEMENTS

(75) Inventors: Nicholas J. Lyons, Houston, TX (US); Danny E. Scott, Montgomery, TX (US)

(73) Assignee: Baker Hughes Incorporated, Houston, TX (US)

( * ) Notice: Subject to any disclaimer, the term of this patent is extended or adjusted under 35 U.S.C. 154(b) by 1395 days.

(21) Appl. No.: 13/245,102

(22) Filed: Sep. 26, 2011

(65) Prior Publication Data
US 2012/0080239 A1  Apr. 5, 2012

Related U.S. Application Data (60) Provisional application No. 61/388,981, filed on Oct. 1, 2010.

(51) Int. Cl.
*E21B 10/573* (2006.01)
*B23B 27/20* (2006.01)
(Continued)

(52) U.S. Cl.
CPC ............ *E21B 10/5735* (2013.01); *B22F 3/14* (2013.01); *B22F 7/06* (2013.01); *B23B 27/148* (2013.01);
(Continued)

(58) Field of Classification Search
USPC .............................. 51/307; 175/428; 264/603
See application file for complete search history.

(56) References Cited

U.S. PATENT DOCUMENTS 4,225,322 A * 9/1980 Knemeyer ...................... 51/295
4,954,139 A * 9/1990 Cerutti ............................ 51/293
(Continued)

FOREIGN PATENT DOCUMENTS

WO    2010083351 A2    7/2010

OTHER PUBLICATIONS

"Copper" Table 1. Structures and Thermal Properties of Pure Metals; ASM Handbook, vol. 13A—Corrosion: Fundamentals, Testing and Protection. 2003 ASM International.*
(Continued)

*Primary Examiner* — Jennifer A Smith
*Assistant Examiner* — Alexandra M Moore
(74) *Attorney, Agent, or Firm* — TraskBritt (57) ABSTRACT

Cutting elements include a substrate, a thermally stable polycrystalline table comprising a superhard material secured to the substrate, and a layer of metal interposed between, and attaching the substrate and the thermally stable polycrystalline table. Methods of forming a cutting element include providing a thermally stable polycrystalline table in a mold, providing a layer of metal on the thermally stable polycrystalline table, distributing a mixture of particles comprising a plurality of hard particles and a plurality of particles comprising a matrix material on the layer of metal, and heating the mold while applying pressure to the mixture of particles to cause the mixture of particles to coalesce and form a substrate and at least partially melt the layer of metal to flow and wet the thermally stable polycrystalline table and the substrate to form an attachment therebetween.

8 Claims, 6 Drawing Sheets

(51) Int. Cl.
| | |
|---|---|
| *B24D 3/00* | (2006.01) |
| *B23B 27/14* | (2006.01) |
| *B24D 99/00* | (2010.01) |
| *B22F 3/14* | (2006.01) |
| *B22F 7/06* | (2006.01) |
| *C22C 26/00* | (2006.01) |
| *C22C 29/08* | (2006.01) |
| *B23B 27/18* | (2006.01) |
| *C09K 3/14* | (2006.01) |
| *B01J 3/06* | (2006.01) |
| *B24D 18/00* | (2006.01) |
| *B22F 5/00* | (2006.01) |

(52) U.S. Cl.
CPC ............... *B23B 27/20* (2013.01); *B24D 3/00* (2013.01); *B24D 99/005* (2013.01); *C22C 26/00* (2013.01); *C22C 29/08* (2013.01); *B01J 3/06* (2013.01); *B22F 2005/001* (2013.01); *B23B 27/18* (2013.01); *B24D 18/00* (2013.01); *C09K 3/14* (2013.01)

(56) References Cited

U.S. PATENT DOCUMENTS

| | | |
|---|---|---|
| 5,244,712 A | 9/1993 | Eden |
| 5,492,188 A * | 2/1996 | Smith et al. .................. 175/432 |
| 2006/0254830 A1* | 11/2006 | Radtke ........................ 175/426 |
| 2008/0206576 A1 | 8/2008 | Qian et al. |
| 2008/0302579 A1* | 12/2008 | Keshavan ................ B22F 7/08 175/434 |
| 2009/0173014 A1* | 7/2009 | Voronin et al. ................. 51/307 |

OTHER PUBLICATIONS

International Preliminary Report on Patentability for International Application No. PCT/US2011/053219 dated Apr. 2, 2013, 6 pages.
International Search Report for International Application No. PCT/US2011/053219 dated May 21, 2012, 4 pages.
International Written Opinion for International Application No. PCT/US2011/053219 dated May 21, 2012, 5 pages.
Chinese Search Report for Chinese Application No. 201180053936.5 dated Jul. 16, 2014.
Canadian Office Action for Canadian Application No. 2,812,573 dated Jun. 2, 2014, 3 pages.

\* cited by examiner

CUTTING ELEMENTS, EARTH-BORING TOOLS INCORPORATING SUCH CUTTING ELEMENTS, AND METHODS OF FORMING SUCH CUTTING ELEMENTS

CROSS-REFERENCE TO RELATED APPLICATION

This application claims the benefit of the filing date of U.S. Provisional Application Ser. No. 61/388,981, filed Oct. 1, 2010, for CUTTING ELEMENTS, EARTH-BORING TOOLS INCORPORATING SUCH CUTTING ELEMENTS, AND METHODS OF FORMING SUCH CUTTING ELEMENTS, the disclosure of which is hereby incorporated herein in its entirety by this reference.

FIELD

Embodiments of the present disclosure relate generally to cutting elements that include a table of thermally stable superabrasive material (e.g., thermally stable polycrystalline diamond) attached to a substrate, to earth-boring tools including such cutting elements, and to methods of forming such cutting elements.

BACKGROUND

Earth-boring tools for forming wellbores in subterranean earth formations may include a plurality of cutting elements secured to a body. For example, fixed-cutter earth-boring rotary drill bits (also referred to as "drag bits") include a plurality of cutting elements that are fixedly attached to a bit body of the drill bit. Similarly, roller cone earth-boring rotary drill bits may include cones that are mounted on bearing pins extending from legs of a bit body such that each cone is capable of rotating about the bearing pin on which it is mounted. A plurality of cutting elements, typically referred to as "inserts," may be mounted to each cone of the drill bit.

The cutting elements used in such earth-boring tools often include polycrystalline diamond compact (often referred to as "PDC") cutting elements, also teamed "cutters," which are cutting elements that include a polycrystalline diamond ("PCD") material, which may be characterized as a superabrasive material. Such polycrystalline diamond materials are formed by sintering and bonding together relatively small diamond (synthetic, natural or a combination) grains or crystals, teamed "grit," under conditions of high temperature and high pressure in the presence of a catalyst (such as, for example, cobalt, iron, nickel, or alloys and mixtures thereof) to form a layer of polycrystalline diamond material, also called a diamond table. These processes are often referred to as high-temperature/high-pressure (or "HTHP") processes. The cutting element substrate may comprise a cermet material (i.e., a ceramic-metal composite material) such as, for example, cobalt-cemented tungsten carbide. In some instances, the polycrystalline diamond table may be fowled on the cutting element, for example, during the HTHP sintering process. In such instances, cobalt (or other catalyst material) in the cutting element substrate may be swept into the diamond grains or crystals during sintering and serve as a catalyst material for forming a diamond table from the diamond grains or crystals. Powdered catalyst material may also be mixed with the diamond grains or crystals prior to sintering the grains or crystals together in an HTHP process. In other methods, however, the polycrystalline diamond table may be formed separately from the cutting element substrate and subsequently attached thereto.

Upon formation of a diamond table using an HTHP process, catalyst material may remain in interstitial spaces between the grains or crystals of diamond in the resulting polycrystalline diamond table. The presence of the catalyst material in the diamond table may contribute to thermal damage in the diamond table when the cutting element is heated during use due to friction at the contact point between the cutting element and the formation. Polycrystalline diamond cutting elements in which the catalyst material remains in the diamond table are generally thermally stable up to a temperature of about seven hundred fifty degrees Celsius (750° C.), although internal stress within the polycrystalline diamond table may begin to develop at temperatures exceeding about three hundred fifty degrees Celsius (350° C.). This internal stress is at least partially due to differences in the rates of thermal expansion between the diamond table and the cutting element substrate to which it is bonded. This differential in thermal expansion rates may result in relatively large compressive and tensile stresses at the interface between the diamond table and the substrate, and may cause the diamond table to delaminate from the substrate. At temperatures of about seven hundred fifty degrees Celsius (750° C.) and above, stresses within the diamond table may increase significantly due to differences in the coefficients of thermal expansion of the diamond material and the catalyst material within the diamond table itself. For example, cobalt thermally expands significantly faster than diamond, which may cause cracks to form and propagate within the diamond table, eventually leading to deterioration of the diamond table and ineffectiveness of the cutting element.

Furthermore, at temperatures at or above about seven hundred fifty degrees Celsius (750° C.), some of the diamond crystals within the diamond table may react with the catalyst material causing the diamond crystals to undergo a chemical breakdown or conversion to another allotrope of carbon. For example, the diamond crystals may graphitize at the diamond crystal boundaries, which may substantially weaken the diamond table. Also, at extremely high temperatures, in addition to graphite, some of the diamond crystals may be converted to carbon monoxide and carbon dioxide.

To reduce the problems associated with different rates of thermal expansion in polycrystalline diamond cutting elements so-called "thermally stable" polycrystalline diamond (TSD) tables have been developed. A thermally stable polycrystalline diamond table may be formed by leaching the catalyst material (e.g., cobalt) out from interstitial spaces between the diamond grains in the diamond table using, for example, an acid or combination of acids (e.g., aqua regia). Nearly or substantially all of the catalyst material may be removed from the diamond table, or only a portion may be removed. Thermally stable polycrystalline diamond tables in which substantially all catalyst material has been leached from the diamond table have been reported to be thermally stable up to temperatures of about one thousand two hundred degrees Celsius (1,200° C.). It has also been reported, however, that such fully leached diamond tables are relatively more brittle and vulnerable to shear, compressive, and tensile stresses than are non-leached diamond tables. In addition, it is difficult to secure a completely leached diamond table to a supporting substrate. In an effort to provide cutting elements having diamond tables that are more thermally stable relative to non-leached diamond tables, but that are also relatively less brittle and less vulnerable to shear, compressive, and tensile stresses relative to fully leached diamond tables, cutting elements have been provided that include a diamond table in which only a portion of the catalyst material has been leached from the diamond table. For example, it is known to leach catalyst material from the cutting face, from the side of the diamond table, or both, to a desired depth within the diamond table, but without leaching all of the catalyst material out from the diamond table.

BRIEF SUMMARY

In some embodiments, the present disclosure includes cutting elements comprising a substrate, a thermally stable polycrystalline superabrasive table secured on an end of the substrate, and a layer of metal interposed between the substrate and the thermally stable polycrystalline superabrasive table and attaching the substrate to the thermally stable polycrystalline superabrasive table.

In additional embodiments, the present disclosure includes earth-boring tools comprising a body and at least one cutting element attached to the body. The cutting element comprises a substrate, a thermally stable polycrystalline superabrasive table attached to an end of the substrate, and a layer of metal interposed between the substrate and the thermally stable polycrystalline superabrasive table at an end of the thermally stable polycrystalline superabrasive table. At least some of the layer of metal is disposed in at least some interstitial spaces between grains of superabrasive material of the thermally stable polycrystalline superabrasive table. A surface of the thermally stable polycrystalline superabrasive table comprises a cutting face opposite the substrate and is at least substantially free of the metal.

Further embodiments of the present disclosure include methods of forming a cutting element comprising providing a preformed, thermally stable polycrystalline superabrasive table in a mold, providing a layer of metal on the thermally stable polycrystalline superabrasive table in the mold, distributing a mixture of particles comprising a plurality of hard particles and a plurality of particles comprising a matrix material on the layer of metal in the mold, and heating the mold while pressure is applied to the mixture of particles to cause the mixture to coalesce and form a substrate and at least partially melt the layer of metal to flow and wet the thermally stable polycrystalline superabrasive table and the substrate and form an attachment therebetween.

BRIEF DESCRIPTION OF THE DRAWINGS

While the specification concludes with claims particularly pointing out and distinctly claiming that which is regarded as embodiments of the present disclosure, various features and advantages of disclosed embodiments may be more readily ascertained from the following description when read in conjunction with the accompanying drawings, in which:

DETAILED DESCRIPTION

The illustrations presented herein are not meant to be actual views of any particular material or device, but are merely idealized representations that are employed to describe the embodiments of the present disclosure. Thus, the drawings are not necessarily to scale and relative dimensions may have been exaggerated for the sake of clarity. Additionally, elements common between figures may retain the same or similar numerical designation.

Although some embodiments of the present disclosure are depicted as being used and employed in fixed-cutter earth-boring rotary drill bits, persons of ordinary skill in the art will understand that the present disclosure may be employed in any earth-boring tool employing a structure comprising a polycrystalline superabrasive material joined to a supporting substrate. Accordingly, the terms "earth-boring tool" and "earth-boring drill bit," as used herein, mean and include any type of bit or tool used for drilling during the formation or enlargement of a wellbore in a subterranean formation and include, for example, rotary drill bits, percussion bits, core bits, eccentric bits, bicenter bits, reamers, mills, drag bits, roller cone bits, hybrid bits, and other drilling bits and tools known in the art.

As used herein, the term "polycrystalline superabrasive table" means and includes any structure comprising a plurality of grains (i.e., crystals) of superabrasive material that are bonded directly together by inter-granular bonds. The crystal structures of the individual grains of the material may be randomly oriented in space within the polycrystalline superabrasive material.

As used herein, the term "inter-granular bond" means and includes any direct atomic bond (e.g., covalent, metallic, etc.) between atoms in adjacent grains of superabrasive material.

As used herein, the term "thermally stable polycrystalline superabrasive table" means and includes polycrystalline superabrasive structures as described herein that have been subjected to a process to at least substantially remove catalyst material disposed in the interstitial spaces between grains in at least a portion of the structure. In one embodiment, the thermally stable polycrystalline superabrasive material comprises a polycrystalline diamond compact from which catalyst has been leached from at least a portion thereof.

As used herein, the term "catalyst material" refers to any material that is capable of at least substantially catalyzing the formation of inter-granular bonds between grains of superabrasive, diamond material during an HTHP process. For example, catalyst materials for diamond include cobalt, iron, nickel, other elements from Group VIIIA of the Periodic Table of the Elements, and alloys thereof.

As used herein, the term "superhard material" means and includes any material having a Knoop hardness value of about 3,000 $Kg/mm^2$ (29,420 MPa) or more. Superhard materials include, for example, diamond and cubic boron nitride. Superhard materials may also be characterized as "superabrasive" materials.

Figure 1:
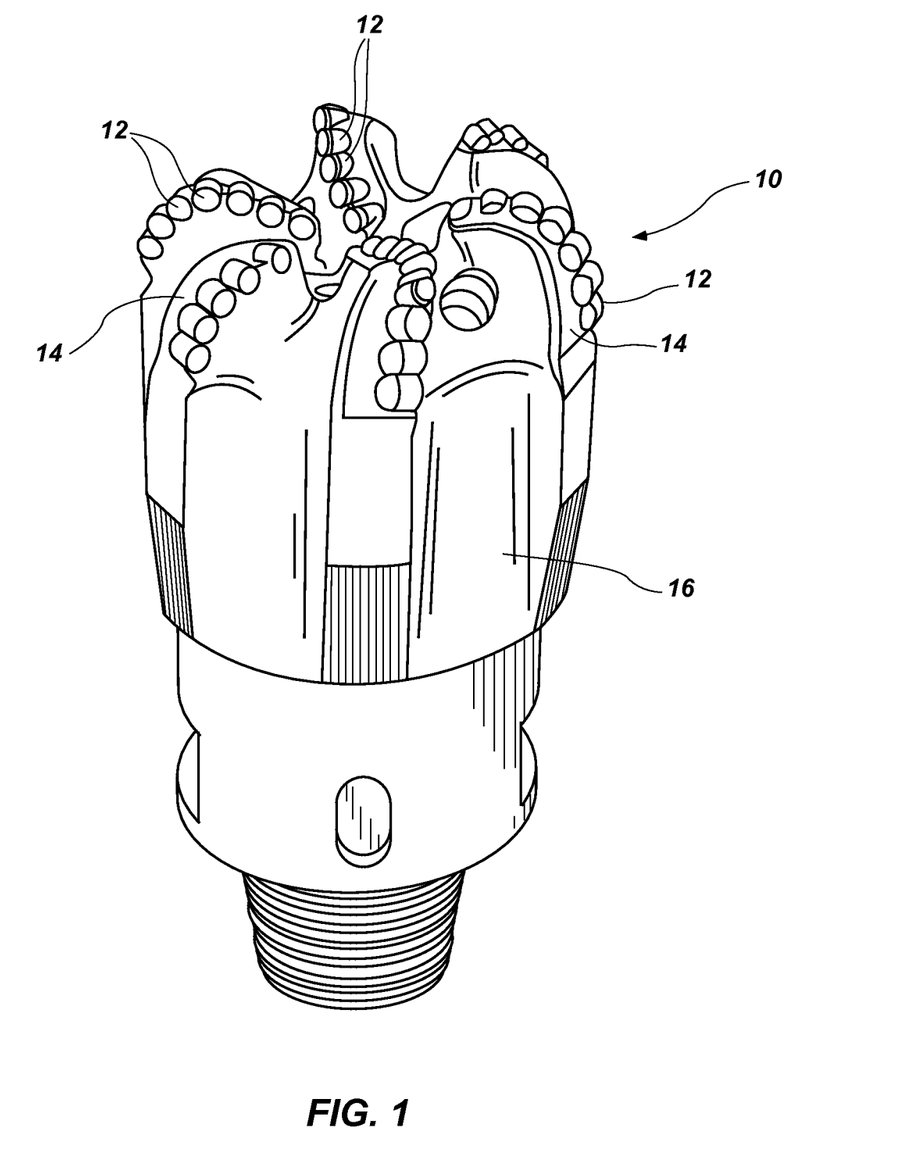
FIG. 1 illustrates a simplified perspective view of an embodiment of an earth-boring drill bit including cutting elements.

Referring to FIG. 1, a simplified illustration of a fixed-cutter earth-boring drill bit 10 according to the present disclosure is shown. The drill bit 10 includes a plurality of cutting elements 12 according to one or more embodiments of the disclosure, each cutting element 12 attached to blades 14 that extend from a body 16 of the drill bit 10 for shearing material from a subterranean formation during drilling.

Figure 2:
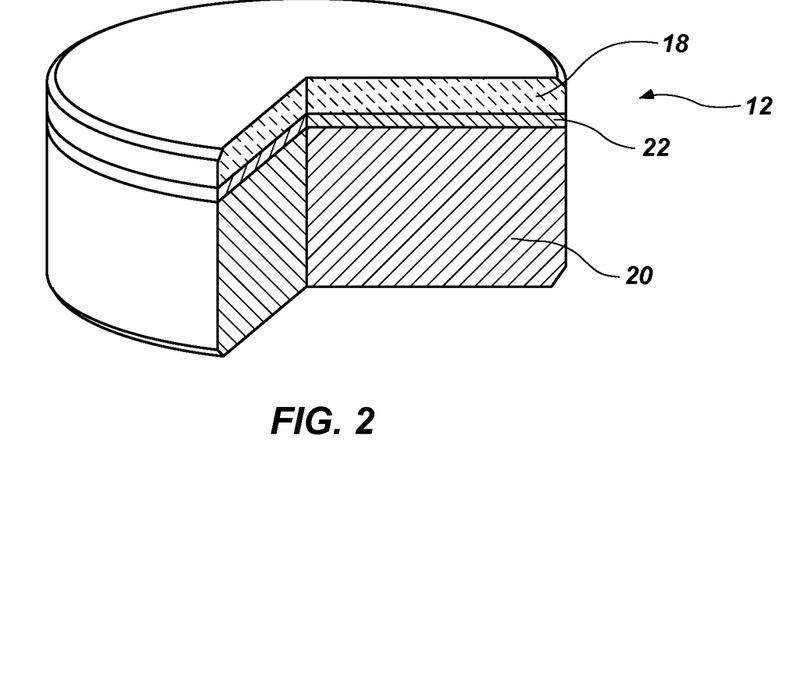
FIG. 2 illustrates a simplified partial cut-away perspective view of a cutting element.

Referring to FIG. 2, a simplified partial cross-sectional perspective view of a cutting element 12 of the present disclosure is depicted. The cutting element 12 may include a thermally stable polycrystalline superabrasive table 18 secured on a surface of a supporting substrate 20. The cutting element 12 further includes a layer of metal 22 interposed between the thermally stable polycrystalline superabrasive table 18 and the substrate 20. Though the cutting element 12 in the embodiment depicted in FIG. 2 is cylindrical or disc-shaped, in other embodiments, the cutting element 12 may have any desirable shape, such as a dome, cone, chisel, etc. Such alternative shapes may be particularly useful for cutting elements employed as inserts in cones of roller cone bits, on the face of percussion bits, and in other earth-boring tools where material is removed from a subterranean formation by a grinding or crushing action.

The substrate 20 may comprise a plurality of hard particles and a plurality of particles comprising a matrix material. For example, the substrate 20 may comprise cemented tungsten carbide or another suitable substrate material, as known in the art. In some embodiments, the thermally stable polycrystalline superabrasive table 18 comprises polycrystalline diamond. In some embodiments, the thermally stable polycrystalline superabrasive table 18 is fully treated such that all or at least substantially all of the catalyst material is removed from interstitial spaces between grains of the polycrystalline superabrasive material exhibiting intergranular bonding. When it is said that at least substantially all the catalyst material is removed, it is meant that some quantities of catalyst material may remain in isolated pockets that are not interconnected to the otherwise continuous interstitial matrix among the interbonded grains of superhard material of the polycrystalline table 18. In other words, the end of the polycrystalline superabrasive table 18 that is to be attached to the substrate 20 and the opposing end of the polycrystalline superabrasive table 18 that is configured to contact and cut away the underlying earth formation, and all of the volume of polycrystalline superabrasive table 18 therebetween may comprise a polycrystalline superabrasive material having voids or pores filled with air in the interstitial spaces between inter-bonded grains. Furthermore, the polycrystalline superabrasive table 18 may be layered with a differing grain size proximate the end of the polycrystalline superabrasive table 18 to be attached to the substrate 20, or the grain size distribution at least in the area of the polycrystalline superabrasive table 18 proximate that end may be controlled to provide an optimum pore structure that facilitates attachment of the thermally stable polycrystalline superabrasive table 18 to the substrate 20. Although the polycrystalline superabrasive table 18 and the substrate 20 are depicted in FIG. 2 as being attached at a substantially planar interface, the interface may comprise any geometry or configuration, such as a non-planar geometry configured to enhance or facilitate attachment between the polycrystalline superabrasive table 18 and the substrate 20. Conventionally, non-planar topographies are employed at the interface between the layer of polycrystalline superabrasive table 18 and the substrate 20 to mechanically enhance the bond between the two components, reduce undesirable stresses and promote desirable stresses at the interface and in adjacent regions of the polycrystalline superabrasive table 18 and of the substrate 20.

The layer of metal 22 may comprise a metal foil, such as a braze foil. As shown in FIG. 2, the layer of metal 22 may be substantially thinner than both the substrate 20 and the thermally stable polycrystalline table 18. In fact, the thickness of the layer of metal 22 is exaggerated in the drawings to promote clarity and understanding of the disclosure. The layer of metal 22 may comprise a metal material, such as Ag, Ni, Cu, Co, Fe, Mn, other metals, or an alloy of any of these. For example, the layer of metal 22 may comprise an alloy or mixture of Co, Ni, Fe, and Mn, and may be formulated and regulated in mass to provide a selected, controlled melting point and volume for predictable penetration into the polycrystalline superabrasive table 18. In one specific example, the layer of metal 22 may comprise at least one of nickel aluminide and nickel silicide. Although the layer of metal 22 is depicted in FIG. 2 as having discrete and distinct boundaries with the thermally stable polycrystalline table 18 and the substrate 20, the layer of metal 22 is desirably disposed in interstitial spaces between grains of the polycrystalline material and may be partially disposed within the material of the substrate 20. Accordingly, the layer of metal 22 may provide a sufficiently robust bond to attach the polycrystalline table 18 to the substrate 20 while maximizing the desirable properties of a thermally stable polycrystalline table 18. In addition, the term "layer of metal" as used herein does not exclude a layer comprising a plurality of sub-layers of the same or different metal materials, or necessarily require that the layer of metal be imperforate.

Figure 3:
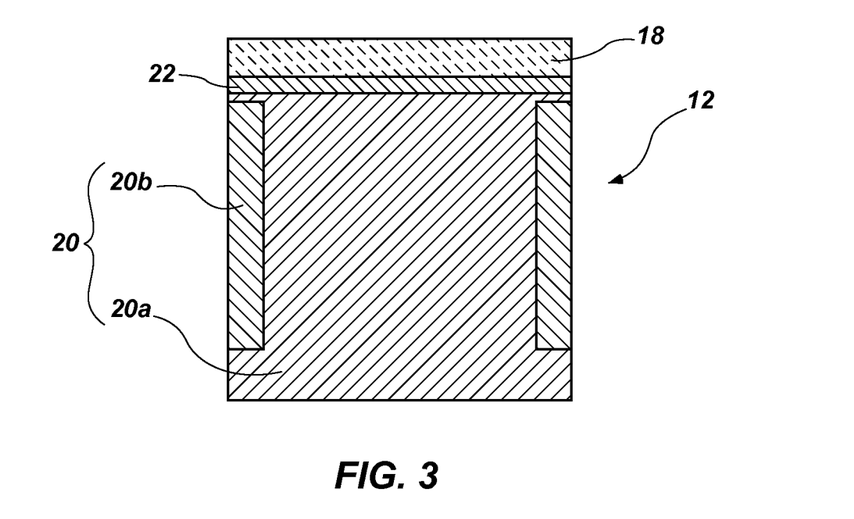
FIG. 3 illustrates a simplified cross-sectional view of an embodiment of a cutting element.

Referring to FIG. 3, a simplified cross-sectional view of a cutting element 12 of an embodiment of the present disclosure similar to the cutting element 12 of FIG. 2 is depicted. As shown in FIG. 3, the hard particles and the matrix material of the substrate 20 may be graded for a desired property distribution through the substrate 20. For example, the portion of the substrate 20 proximate the outer diameter portion 20b may comprise a volume percentage of hard particles and a volume percentage of matrix material selected to impart high hardness and strength to the outer diameter portion 20b of the substrate 20. By contrast, the remainder of the substrate 20a may comprise a volume percentage of hard particles and a volume percentage of matrix material selected for optimal attachment to the layer of metal 22. In other words, the volume percentage of hard particles in the outer diameter portion 20b may be higher than the volume percentage of hard particles in the remainder of the substrate 20a. In addition, the hard particles in different regions of the substrate 20, for example 20a and 20b, may be of different grain sizes to impart the aforementioned, or other, different characteristics. Similarly, different regions of the substrate 20 may comprise particles of different mixtures, and numbers, of grain sizes to achieve desirable characteristics. Although the outer diameter portion 20b and the remainder of the substrate 20a are depicted in FIG. 3 as having discrete and distinct boundaries, portions of the substrate 20 may have a more gradual distribution of properties, which may be characterized as a gradient, such that no boundary is readily discernable between the different portions of the substrate 20. Moreover, while an interface between the outer diameter portion 20b and the remainder of the substrate 20a depicted in FIG. 3 is a planar interface, the interface geometry may be more complex in other embodiments, comprising interface features configured to physically enhance bonding between the outer diameter portion 20b and the remainder of the substrate 20a by providing additional surface area and mechanical interlocking.

Figure 4:
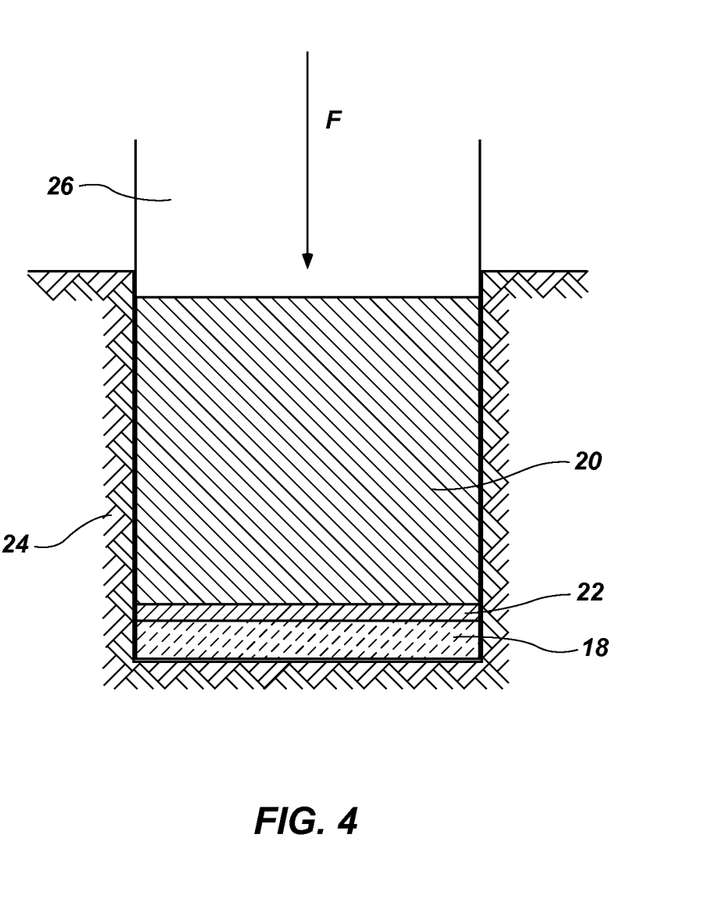
FIG. 4 illustrates a simplified cross-section of an act in method of forming a cutting element.

FIG. 4 illustrates a simplified cross-sectional view of an act in a method of forming cutting elements 12 in accordance with an embodiment of the present disclosure. In this embodiment, a preformed thermally stable polycrystalline table 18 may be provided in a mold 24. A layer of metal 22, such as, for example, a braze foil, film or mesh may be provided on the upper surface of the layer of thermally stable polycrystalline table 18. Alternatively, a layer of metal 22 may be deposited on the preformed thermally stable polycrystalline table 18 prior to placing the preformed thermally stable polycrystalline table 18 in the mold 24 by a vapor deposition process, such as, for example, a chemical vapor deposition (CVD) process, a plasma-enhanced chemical vapor deposition (PECVD) process, an atomic layer deposition (ALD) process, or a physical vapor deposition (PVD) process (e.g., sputtering) may be employed to place the metal material on the face of the preformed thermally stable polycrystalline table 18 to be bonded to a substrate 20. The use of a deposition process may enhance penetration of the metal material into interstitial spaces between grains of the polycrystalline material. A mixture of particles comprising a plurality of hard particles and a plurality of particles comprising a matrix material may be distributed on the layer of metal 22. As previously discussed, the mixture of particles may be selectively distributed to impart specific, differing desired characteristics to different regions of the substrate 20. In addition to the mixture of particles, a preformed substrate component, such as, for example, a preformed, tubular sheath at the outer diameter of the mold cavity or a series of rods intermixed with the mixture of particles, may also be placed in the mold to add stiffness or erosion resistance to a final cutting element 12. For example, the preformed sheath may comprise a pre-sintered tungsten carbide annular member.

The preformed substrate component may include a surface coating to enhance bonding between the mixture of particles and the preformed substrate component. For example, a surface coating on a portion or portions of the preformed component intended to bond with the mixture of particles may comprise, molybdenum, tungsten, cobalt, nickel, or an alloy comprising any of these. Further, a surface coating on the exterior of the preformed component may be selected to reduce sliding friction from contact with a formation being drilled, to enhance erosion or abrasion resistance, or a combination of such characteristics. For example, a surface coating to reduce erosion or corrosion may comprise an alloy of chromium. Such exterior surface coatings may also be applied after manufacture of a cutting element 12.

The thermally stable polycrystalline table 18, the layer of metal 22, and the mixture of particles may be subjected to a hot pressing process in some embodiments. For example, a plunger 26 may exert a force F in a direction indicated by an arrow in FIG. 4 to place pressure on the thermally stable polycrystalline table 18, the layer of metal 22, and the mixture of particles in the mold. The thermally stable polycrystalline table 18, the layer of metal 22, and the mixture of particles may then be subjected to elevated temperatures sufficient to cause the mixture of particles to coalesce to form a substrate 20. In addition, the elevated temperature may be sufficient to at least partially melt the layer of metal 22. The elevated temperature may also be lower than a temperature at which diamond grain growth may occur, such as, for example, less than 1320° C., in some embodiments. For example, the thermally stable polycrystalline table 18, the layer of metal 22, and the mixture of particles may be subjected to about one thousand one hundred degrees Celsius (1,100° C.) for a duration of time short enough that the thermally stable polycrystalline table 18 is not damaged, while a pressure of about five hundred to thirty thousand pounds per square inch (500 psi-30,000 psi) is applied. More specifically, the mold 24 and its contents may be exposed to a temperature of between about 400° C. and about 1250° C. and a pressure of between about 4,500 psi and about 27,500 psi may be applied to the contents of the mold 24. In other embodiments, the elevated temperature may exceed 1320° C. For example, the elevated temperature may be 1,500° C., 1,700° C., 2,200° C., or even greater in such embodiments.

The at least partially melted layer of metal 22 may then flow and wet the thermally stable polycrystalline table 18 and the substrate 20. For example, the at least partially melted layer of metal 22 may at least partially infiltrate the thermally stable polycrystalline table 18 in interstitial spaces between grains thereof. The extent to which the at least partially melted layer of metal 22 infiltrates the thermally stable polycrystalline table 18 may be controlled by selecting the material composition of the metal 22, the volume of metal 22 present, the duration of exposure to high heat, the temperature, or any combination of these. For example, the at least partially melted layer of metal 22 may infiltrate between about 10 µm and about 1,000 µm into the thermally stable polycrystalline table 18. More specifically, the at least partially melted layer of metal 22 may infiltrate between about 50 µm and about 200 µm into the thermally stable polycrystalline table 18. In this way, a portion of the thermally stable polycrystalline table 18 (e.g., an end of the thermally stable polycrystalline table 18 opposing the layer of metal 22) may remain at least substantially free of other material (e.g., catalyst material or material of the layer of metal 22) disposed in the interstitial spaces between grains of the material of the thermally stable polycrystalline table 18 during and after attachment of the thermally stable polycrystalline table 18 to the substrate 20. In such embodiments, additional subsequent leaching of the thermally stable polycrystalline table 18 may be unnecessary. However, additional subsequent leaching of the thermally stable polycrystalline table 18 may take place in these or other embodiments. For example, subsequent leaching of the thermally stable polycrystalline table 18 may take place where the at least partially melted layer of non-catalytic metal 22 infiltrates an entire thickness of the polycrystalline table 18.

Additionally or in the alternative, a non-catalyst material may be infiltrated into interstitial spaces between grains of the thermally stable polycrystalline table 18 during the high-temperature/high-pressure process or prior to the high-temperature/high-pressure process from the end of the polycrystalline superabrasive table 18 opposite the layer of metal 22 to prevent sweep of the metal 22 into the thermally stable polycrystalline superabrasive table 18 beyond a desired depth. For example, copper, aluminum, silver, alloys of these, silicon, or any combination of the foregoing materials may be infiltrated into interstitial spaces between grains of the thermally stable polycrystalline table 18 to prevent sweep of the metal 22 into the polycrystalline table 18 beyond a desired depth. More specifically, nickel aluminide, nickel silicide, or a combination of these may be infiltrated into interstitial spaces between grains of the thermally stable polycrystalline table 18. Alternatively, the end of the polycrystalline superabrasive table 18 to be placed opposite the layer of metal 22 in mold 24 may be pre-infiltrated with a non-catalyst material. In other embodiments, the thermally stable polycrystalline table 18, the layer of metal 22, and the mixture of particles or a preformed substrate 20 may be subjected to hot isostatic pressing (HIP) or rapic omnidirectional compaction (ROC) to cause the layer of metal to flow and secure the polycrystalline table to the substrate 20. Consequently, the layer of metal 22 may secure the thermally stable polycrystalline table 18 to the substrate 20 while the cutting surface of the thermally stable polycrystalline table 18 may be substantially free of catalyst and metal material.

Figure 5A:
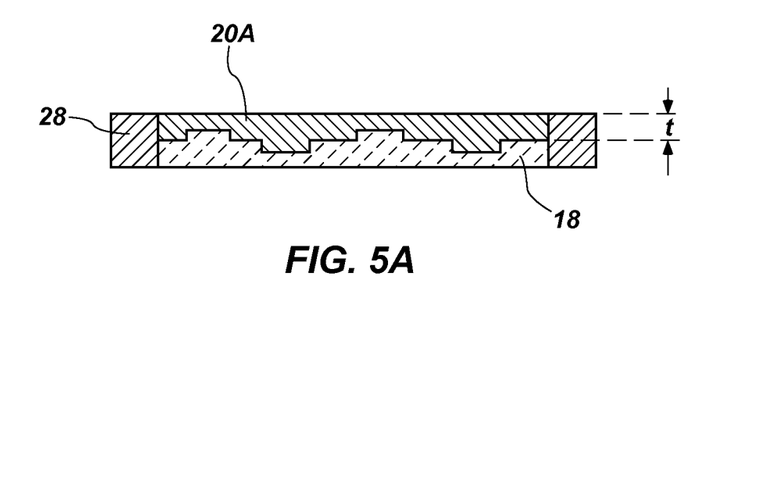
FIGS. 5A and 5B are cross-sectional views of acts in another embodiment of a method of forming a cutting element.
Figure 5B:
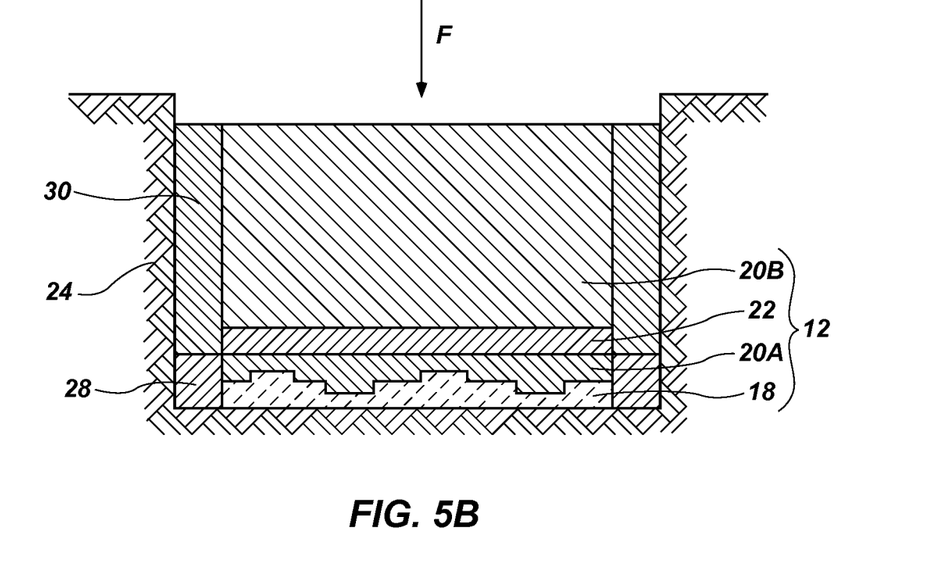

Referring to FIGS. 5A and 5B, acts in another embodiment of a method of forming a cutting element 12 are shown. As shown in FIG. 5A, a preformed polycrystalline table 18 may be formed and concurrently attached to a first substrate portion 20A using a conventional HTHP process. As shown in FIG. 5A, an interface between the polycrystalline table 18 and the first substrate portion 20A may be non-planar. The first substrate portion 20A may have a thickness t that is less than a final substrate thickness for a fully formed cutting element 12. More specifically, the first substrate portion 20A may have thickness t that is less than a thickness of a second substrate portion 20B (see FIG. 5B) to which the polycrystalline table 18 and the first substrate portion 20A may be attached. For example, the thickness t of the first substrate portion 20A may be between about 50 μm and about 2,000 μm. More specifically, the thickness t of the first substrate portion 20A may be between about 500 μm and about 1,000 μm. The preformed polycrystalline table 18 and the first substrate portion 20A attached thereto may be located in a support structure 28. For example, the preformed polycrystalline table 18 may be inserted into a discrete support structure 28 in some embodiments. In other embodiments, the support structure 28 may be a sacrificial structure formed around the polycrystalline table 18, the first substrate portion 20A, or the polycrystalline table 18 and the first substrate portion 20A. For example, the support structure 28 may be integrally formed with and formed of the same material as the polycrystalline table 18, and may be shaped and sized to surround the polycrystalline table 18 and extend around the first substrate portion 20A. As another example, the support structure 28 may comprise a metal or polymer ring formed around the first substrate portion 20A and optionally around the polycrystalline table 18 (e.g., by chemical vapor deposition (CVD) or by physical vapor deposition (PVD)). The support structure 28 may comprise, for example, an annular member which may surround the side surfaces of the preformed polycrystalline table 18 and the first substrate portion 20A. The support structure 28 may place the preformed polycrystalline table 18 and the first substrate portion 20A in a state of compression in some embodiments. For example, the support structure 28 may comprise a compression ring surrounding the sides of the first substrate portion 20A and optionally the polycrystalline table 18.

After placement into the support structure 28, the preformed polycrystalline table 18 and the first substrate portion 20A may be subjected to a leaching process. For example, a leaching agent (e.g., aqua regia) may be introduced to the preformed polycrystalline table 18 and the first substrate portion 20A to at least substantially remove catalyst material in the interstitial spaces among interbonded grains of the material of the polycrystalline table 18 and to at least substantially remove metal matrix material from the cermet material of the first substrate portion 20A. The support structure 28 may remain at least substantially unaffected by the leaching agent. Thus, the support structure 28 may be formed from a material or materials that are resistant or impervious to conventional leaching agents, such as, for example, ceramic materials, metals, and polymers known to resist leaching agents. For example, the support structure 28 may comprise polycrystalline diamond, chrome, tungsten, polystyrene, high temperature oxides, or other materials known to resist leaching agents. Subsequent to the leaching process, the polycrystalline table 18 may be thermally stable, the polycrystalline table 18 may not be directly attached to the leached first substrate portion 20A, and the hard particles of the particle phase of the leached first substrate portion 20A may be at least substantially unbonded from one another. Accordingly, the support structure 28 may enable the thermally stable polycrystalline table 18 and the leached first substrate portion 20A to retain their shape and relative positioning during subsequent handling and processing.

The thermally stable polycrystalline table 18 and the leached first substrate portion 20A may be placed into a mold 24 (e.g., a hot press die), as shown in FIG. 5B. The support structure 28 may remain around the thermally stable polycrystalline table 18 and the leached first substrate portion 20A during placement and processing in the mold 24 in some embodiments. In other embodiments, the support structure 28 may be removed from around the thermally stable polycrystalline table 18 and the leached first substrate portion 20A prior to placement and processing in the mold 24. A layer of metal 22 may be disposed in the mold 24 adjacent the leached first substrate portion 20A on an end opposing the thermally stable polycrystalline table 18, and a second substrate portion 20B may be disposed adjacent the layer of metal 22 on a side opposing the first substrate portion 20A in a manner similar to that previously described in connection with FIG. 4. In embodiments where the support structure 28 is placed into the mold 24, a sheath 30 may be placed around the second substrate portion 20B and the layer of metal 22 to fill what may otherwise be a void between the second substrate portion 20B, the layer of metal 22, and sidewalls of the mold 24. A hot pressing process, such as, for example, those hot pressing processes described previously in connection with FIG. 4, may be applied to the components in the mold 24. The layer of metal 22 may melt, infiltrate the first substrate portion 20A, at least partially infiltrate the thermally stable polycrystalline table 18, and optionally partially infiltrate the second substrate portion 20B. Thus, the second substrate portion 20B, the layer of metal 22, the first substrate portion 20A, and the thermally stable polycrystalline table 18 may be attached to one another to form a complete cutting element 12. After formation of the cutting element 12, the support structure 28 and sheath 30 may be removed.

Figure 6A:
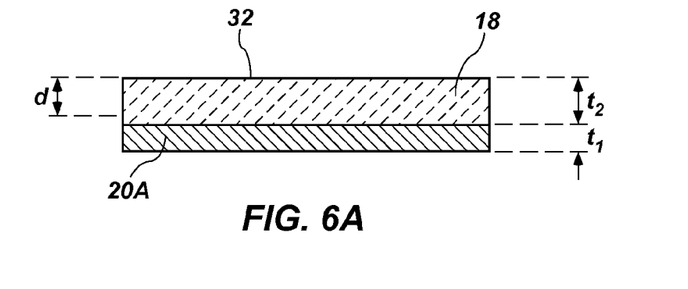
FIGS. 6A through 6C are cross-sectional views of acts in another embodiment of a method of forming a cutting element.
Figure 6B:
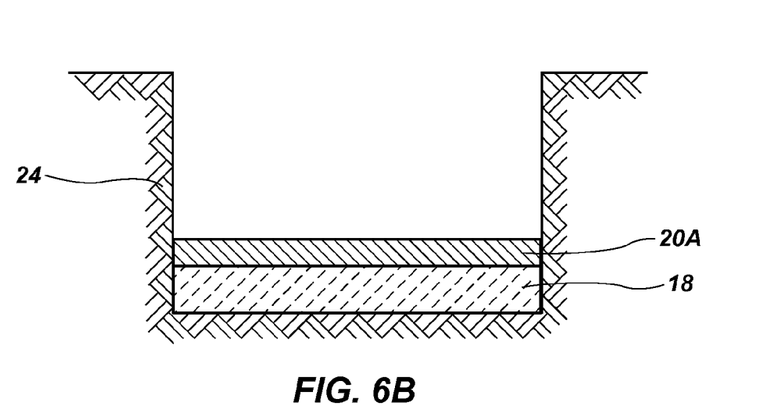
Figure 6C:
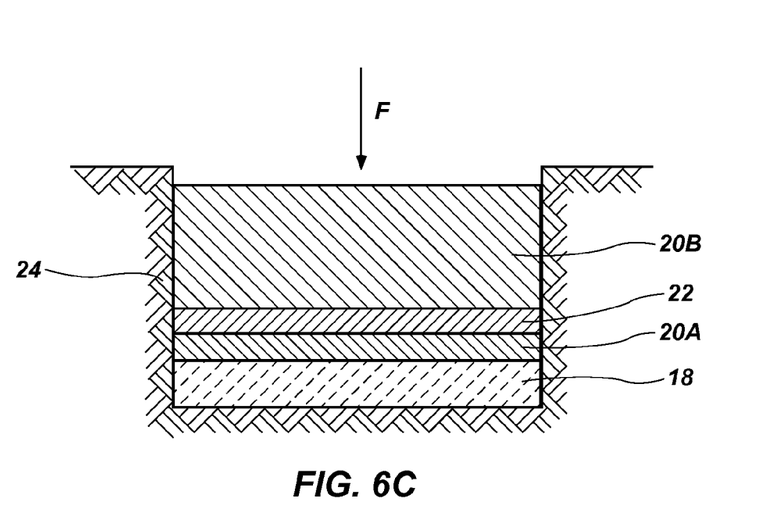

Referring to FIGS. 6A through 6C, acts in another embodiment of forming a cutting element 12 are shown. As shown in FIG. 6A, a preformed polycrystalline table 18 may be formed and concurrently attached to a first substrate portion 20A using a conventional HTHP process. The first substrate portion 20A may have a thickness $t_1$ that is less than a final substrate thickness for a fully formed cutting element 12, as discussed previously in connection with FIG. 5A. The polycrystalline table 18 may be leached from a cutting face 32 of the polycrystalline table 18 toward the first substrate portion 20A to which the polycrystalline table 18 is attached. This first leaching process may remove catalyst material to a depth d within the polycrystalline table 18 that is less than the total thickness $t_2$ of the polycrystalline table 18. For example, the depth d to which the catalyst material is leached from the polycrystalline table 18 may be about 75% of the thickness $t_2$ of the polycrystalline table 18, about 85% of the thickness $t_2$ of the polycrystalline table 18, about 95% of the thickness $t_2$ of the polycrystalline table 18, or even about 99% of the thickness $t_2$ of the polycrystalline table 18. Thus, at least some catalyst material may remain in the polycrystalline table 18, especially at or near the interface with the first substrate portion 20A, and the first substrate portion 20A may retain most or all of the metal matrix in which a hard particle phase is dispersed.

The partially leached polycrystalline table 18 and the unleached first substrate portion 20A may then be placed in an orientation in which they will remain during subsequent formation of a complete cutting element 12 (see FIG. 6C) in some embodiments. In other embodiments, the initial leaching from the cutting face 32 into the polycrystalline table 18 may not be performed, and all leaching may be performed while the polycrystalline table 18 and the first substrate portion 20A are in the orientation in which they will remain during subsequent formation of the complete cutting element 12 (see FIG. 6C). The partially leached polycrystalline table 18 and the unleached first substrate portion 20A may be placed in a mold 24 (e.g., a hot press die) with the polycrystalline table 18 facing a bottom of the mold 24 in some embodiments, as shown in FIG. 6B. In other embodiments, the partially leached polycrystalline table 18 may merely be oriented below the unleached first substrate portion 20A and may optionally be placed in a support structure 28 (see FIG. 5A). The unleached first substrate portion 20A and the partially leached polycrystalline table 18 may then be at least substantially fully leached. For example, a leaching agent may at least substantially completely remove catalyst material and metal matrix material beginning from an end of the first substrate portion 20A opposing the polycrystalline table 18 through a remainder of the first substrate portion 20A and the polycrystalline table 18. Subsequent to the leaching process, the polycrystalline table 18 may be thermally stable, the polycrystalline table 18 may not be directly attached to the leached first substrate portion 20A, and the hard particles of the particle phase of the leached first substrate portion 20A may be at least substantially unbonded from one another. The mold 24 may enable the thermally stable polycrystalline table 18 and the leached first substrate portion 20A to retain their shape and relative positioning during subsequent handling and processing in some embodiments. In other embodiments, the optional support structure 28 or merely the prior orientation of the polycrystalline table 18 and the first substrate portion 20A may enable the thermally stable polycrystalline table 18 and the leached first substrate portion 20A to retain their shape and relative positioning during subsequent handling and processing.

The thermally stable polycrystalline table 18 and the leached first substrate portion 20A may be subjected to a hot pressing process, as shown in FIG. 6C. A layer of metal 22 may be disposed in the mold 24 adjacent the leached first substrate portion 20A on an end opposing the thermally stable polycrystalline table 18, and a second substrate portion 20B may be disposed adjacent the layer of metal 22 on a side opposing the first substrate portion 20A in a manner similar to that previously described in connection with FIG. 4. A hot pressing process, such as, for example, those hot pressing processes described previously in connection with FIG. 4, may be applied to the components in the mold 24. The layer of metal 22 may melt, infiltrate the first substrate portion 20A, at least partially infiltrate the thermally stable polycrystalline table 18, and optionally partially infiltrate the second substrate portion 20B. Thus, the second substrate portion 20B, the layer of metal 22, the first substrate portion 20A, and the thermally stable polycrystalline table 18 may be attached to one another to form a complete cutting element 12.

Figure 7A:
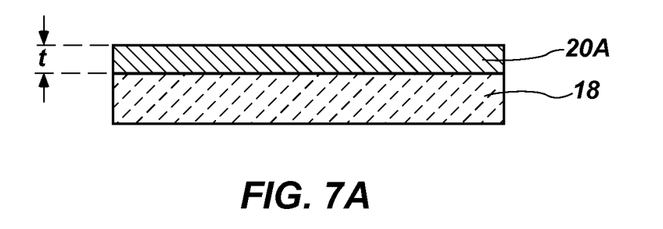
FIGS. 7A and 7B are cross-sectional views of acts in yet another embodiment of a method of forming a cutting element.
Figure 7B:
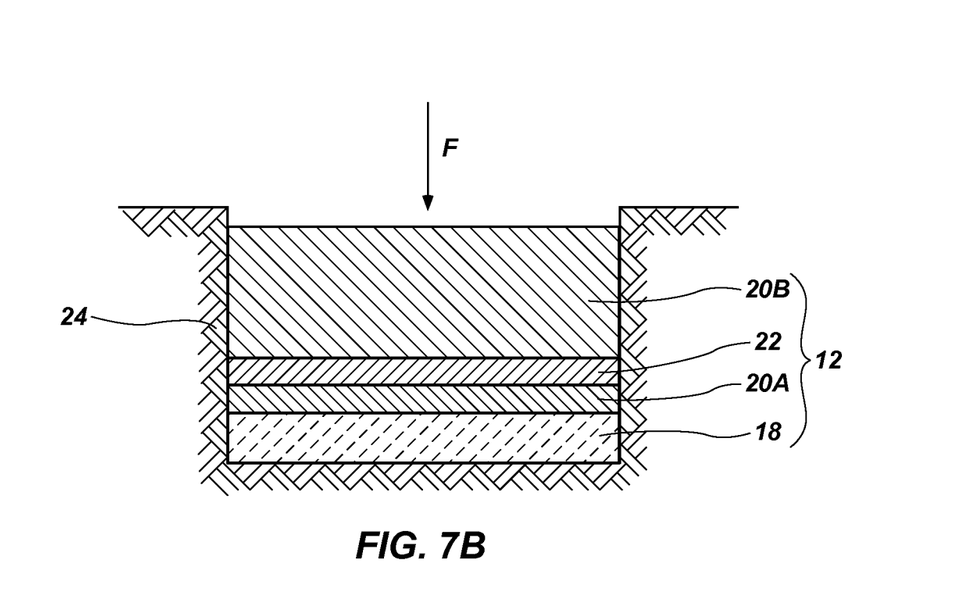

Referring to FIGS. 7A and 7B, acts in another embodiment of a method for forming a cutting element 12 are shown. As shown in FIG. 7A, a preformed polycrystalline table 18 may be formed and concurrently attached to a first substrate portion 20A using a conventional HTHP process. The first substrate portion 20A may have a thickness t that is less than a final substrate thickness for a fully formed cutting element 12, as discussed previously in connection with FIG. 5A. The first substrate portion 20A may be formed of a cermet material, and a matrix material of the cermet material may be a material that is resistant or impervious to one or more conventional leaching agents. For example, the matrix material of the first substrate portion 20A may comprise polycrystalline diamond, cubic boron nitride, tungsten, or a tungsten alloy. In embodiments where the first substrate portion 20A comprises polycrystalline diamond, grains of the material of the first substrate portion 20A may be interbonded with grains of the material of the polycrystalline table 18. In other embodiments, the matrix material of the first substrate portion 20A may extend into the structure of the polycrystalline table 18, such as, for example, by including the non-planar interface as shown in FIGS. 5A and 5B. Such leach-resistant matrix material may also optionally infiltrate interstitial spaces among interbonded grains of the material of the polycrystalline table 18 during the conventional HTHP process. The first substrate portion 20A may also include other matrix materials, such as, for example, catalyst metals as described previously, in addition to the matrix material or materials resistant or impervious to a chosen leaching agent. The matrix material that is susceptible to leaching may infiltrate interstitial spaces among interbonded grains of the material of the polycrystalline table 18 during the conventional HTHP process along with, or instead of, the leach-resistant matrix material.

The polycrystalline table 18 and the first substrate portion 20A may be at least substantially fully leached. For example, a leaching agent may at least substantially completely remove catalyst material and leach-susceptible matrix material from the polycrystalline table 18 and the first substrate portion 20A. Accordingly, when it is said that matrix material is at least substantially fully leached from the thermally stable polycrystalline table 18 and the first substrate portion 20A, it is meant that that portion of the matrix material that is susceptible to leaching is removed and matrix material that is selected to resist conventional leaching agents may remain in the first substrate portion 20A and optionally may remain in the thermally stable polycrystalline table 18. Subsequent to the leaching process, the polycrystalline table 18 may be thermally stable, the polycrystalline table 18 may optionally remain directly attached to the leached first substrate portion 20A by the leach-resistant matrix material, and the hard particles of the particle phase of the leached first substrate portion 20A may remain at least substantially bonded to one another through the leach-resistant matrix material. Thus, the leach-resistant matrix material may enable the thermally stable polycrystalline table 18 and the leached first substrate portion 20A to retain their shape and relative positioning during subsequent handling and processing in some embodiments. In embodiments where the leach-resistant matrix material does not infiltrate the polycrystalline table 18 during the conventional HTHP process, an optional support structure 28, the prior orientation of the polycrystalline table 18 and the first substrate portion 20A, or disposing the polycrystalline table 18 and the first substrate portion 20A into a mold 24 (see FIG. 7B) prior to leaching may enable the thermally stable polycrystalline table 18 and the leached first substrate portion 20A to retain their relative positioning during subsequent handling and processing.

The thermally stable polycrystalline table 18 and the leached first substrate portion 20A may be subjected to a hot pressing process, as shown in FIG. 7B. A layer of metal 22 may be disposed in the mold 24 adjacent the leached first substrate portion 20A on an end opposing the thermally stable polycrystalline table 18, and a second substrate portion 20B may be disposed adjacent the layer of metal 22 on a side opposing the first substrate portion 20A in a manner similar to that previously described in connection with FIG. 4. A hot pressing process, such as, for example, those hot pressing processes described previously in connection with FIG. 4, may be applied to the components in the mold 24. The layer of metal 22 may melt, infiltrate the first substrate portion 20A, at least partially infiltrate the thermally stable polycrystalline table 18, and optionally partially infiltrate the second substrate portion 20B. Thus, the second substrate portion 20B, the layer of metal 22, the first substrate portion 20A, and the thermally stable polycrystalline table 18 may be attached to one another to form a complete cutting element 12.

While the present disclosure has been described herein with respect to certain example embodiments, those of ordinary skill in the art will recognize and appreciate that it is not so limited. Rather, many additions, deletions, and modifications to the embodiments described herein may be made without departing from the scope of embodiments of the invention as hereinafter claimed, including legal equivalents. In addition, features from one embodiment may be combined with features of another embodiment while still being encompassed within the scope of the invention as contemplated by the inventors.

What is claimed is:

1. A cutting element, comprising:
    a substrate;
    a thermally stable polycrystalline table comprising interbonded grains of a superhard material and interstitial spaces among the interbonded grains of the superhard material, the thermally stable polycrystalline table being at least substantially devoid of catalyst material used to form intergranular bonds among the interbonded grains of the superhard material;
    a substrate portion interposed between the thermally stable polycrystalline table and the substrate; and
    a metal material attaching the substrate to the substrate portion, the metal material extending from proximate the substrate, through the substrate portion, and partially into the thermally stable polycrystalline table, the metal material exhibiting a melting temperature of less than 1320° C.

2. The cutting element of claim 1, wherein the metal material exhibits a melting temperature of less than 1,100° C.

3. The cutting element of claim 1, wherein the substrate portion has a thickness less than a thickness of the substrate.

4. The cutting element of claim 1, wherein a portion of the thermally stable polycrystalline table at an end of the thermally stable polycrystalline table opposing the substrate portion is at least substantially free of catalyst material and of the metal material.

5. The cutting element of claim 1, wherein an outer diameter of the substrate has a higher volume percentage of hard particles and a lower volume percentage of matrix material than a volume percentage of hard particles and a volume percentage of matrix material in a remainder of the substrate.

6. An earth-boring tool, comprising:
    a body; and
    at least one cutting element attached to the body, the at least one cutting element comprising:
        a substrate;
        a thermally stable polycrystalline table comprising interbonded grains of a superhard material and interstitial spaces among the interbonded grains of the superhard material, the thermally stable polycrystalline table being at least substantially devoid of catalyst material used to form intergranular bonds among the interbonded grains of the superhard material;
        a substrate portion interposed between the thermally stable polycrystalline table and the substrate; and
        a metal material attaching the substrate to the substrate portion, the metal material extending from proximate the substrate, through the substrate portion, and partially into the thermally stable polycrystalline table, the metal material exhibiting a melting temperature of less than 1320° C.,
        wherein a cutting face of the thermally stable polycrystalline table is located opposite the substrate and is at least substantially free of the metal material.

7. The earth-boring tool of claim 6, wherein an outer diameter of the substrate has a higher volume percentage of hard particles and a lower volume percentage of matrix material than a volume percentage of hard particles and a volume percentage of matrix material in a remainder of the substrate.

8. The earth-boring tool of claim 6, wherein the metal material exhibits a melting temperature of less than 1100° C.

* * * * *

UNITED STATES PATENT AND TRADEMARK OFFICE
CERTIFICATE OF CORRECTION

PATENT NO. : 10,113,368 B2  
APPLICATION NO. : 13/245102  
DATED : October 30, 2018  
INVENTOR(S) : Nicholas J. Lyons and Danny E. Scott Page 1 of 1

It is certified that error appears in the above-identified patent and that said Letters Patent is hereby corrected as shown below:

In the Specification

| | | |
|---|---|---|
| Column 1, | Line 43, | change "elements, also teamed" to --elements, also termed-- |
| Column 1, | Line 49, | change "or crystals, teamed" to --or crystals, termed-- |
| Column 1, | Line 59, | change "fowled on the" to --formed on the-- |

Signed and Sealed this  
Fifth Day of February, 2019

Andrei Iancu  
*Director of the United States Patent and Trademark Office*